United States Patent
Capel et al.

(12)
(10) Patent No.: US 9,158,733 B2
(45) Date of Patent: Oct. 13, 2015

(54) COMPUTERIZED SYSTEM AND METHOD FOR LINKING A USER'S E-MAIL THAT TRACKS A USER'S INTEREST AND ACTIVITY

(75) Inventors: Neil James Capel, New York, NY (US); Ian Bradford White, New York, NY (US)

(73) Assignee: Sailthru, Inc., New York, NY (US)

( * ) Notice: Subject to any disclaimer, the term of this patent is extended or adjusted under 35 U.S.C. 154(b) by 143 days.

(21) Appl. No.: 13/041,444

(22) Filed: Mar. 7, 2011

(65) Prior Publication Data

US 2011/0219115 A1    Sep. 8, 2011

Related U.S. Application Data

(60) Provisional application No. 61/311,356, filed on Mar. 7, 2010.

(51) Int. Cl.
*G06F 15/173* (2006.01)

(52) U.S. Cl.
CPC .................................. *G06F 15/173* (2013.01)

(58) Field of Classification Search
CPC .. H04L 29/08072; H04L 29/06; G06F 15/173

USPC .......................................................... 709/224
See application file for complete search history.

(56) References Cited

U.S. PATENT DOCUMENTS

| | | | |
|---|---|---|---|
| 7,072,947 B1 * | 7/2006 | Knox et al. .................... 709/217 |
| 2002/0078191 A1 * | 6/2002 | Lorenz ........................... 709/223 |
| 2008/0201310 A1 * | 8/2008 | Fitzpatrick et al. ................ 707/4 |
| 2011/0238525 A1 * | 9/2011 | Linden et al. ................ 705/26.7 |

* cited by examiner

*Primary Examiner* — June Sison
*Assistant Examiner* — Steven Nguyen
(74) *Attorney, Agent, or Firm* — Leason Ellis LLP

(57) ABSTRACT

The present invention is a computerized system to link a user's e-mail openings and click throughs on the user's e-mail address to the user's online click stream that tracks the user's interests and activity behavior data on the user's destination websites. The system includes a dedicated tracking sub domain, a programmable tracking code embeddable on the destination site, a domain tracking cookie, a tagging engine and a template engine. The invention also includes a method for using the computerized system that generates a domain tracking cookie that is tied to an e-mail address, tracks the user on a destination site using a programmable tracking code, tracks and updates the user's interests and activity behavior data using the tracking code and takes the data to customize e-mails and the website to the user's interests and activity.

13 Claims, 2 Drawing Sheets

COMPUTERIZED SYSTEM AND METHOD FOR LINKING A USER'S E-MAIL THAT TRACKS A USER'S INTEREST AND ACTIVITY

This application claims priority to U.S. Provisional Application 61/311,356 filed on Mar. 7, 2010, the entire disclosure of which is incorporated by reference.

TECHNICAL FIELD & BACKGROUND

E-mail recipients are not profiled for their behavior on-site after clicking from an e-mail. E-mail click data and site behavior data are measured separately, if at all, but not together. E-mail providers do not measure onsite behavior, nor are site analytics packages integrated with e-mail.

The present invention generally relates to a computerized system and method. More specifically, the invention is a computerized system and method for linkage of e-mail opens and click throughs to a user's online click stream and the tracking of an individual's interests and activity on a destination site.

It is an object of the invention to provide a computerized system and method to unify e-mail click data and behavioral data by setting a domain tracking cookie and measuring on-site user behavior.

What is really needed is a computerized system and method that utilizes a linkage of e-mail opens and click throughs to a user's online click stream and the tracking of an individual's interests and activity on a destination site to a user's online click stream.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION OF ILLUSTRATIVE EMBODIMENTS

Various aspects of the illustrative embodiments will be described using terms commonly employed by those skilled in the art to convey the substance of their work to others skilled in the art. However, it will be apparent to those skilled in the art that the present invention may be practiced with only some of the described aspects. For purposes of explanation, specific numbers, materials and configurations are set forth in order to provide a thorough understanding of the illustrative embodiments. However, it will be apparent to one skilled in the art that the present invention may be practiced without the specific details. In other instances, well-known features are omitted or simplified in order not to obscure the illustrative embodiments.

Various operations will be described as multiple discrete operations, in turn, in a manner that is most helpful in understanding the present invention. However, the order of description should not be construed as to imply that these operations are necessarily order dependent. In particular, these operations need not be performed in the order of presentation.

The phrase "in one embodiment" is used repeatedly. The phrase generally does not refer to the same embodiment, however, it may. The terms "comprising", "having" and "including" are synonymous, unless the context dictates otherwise.

Figure 1:
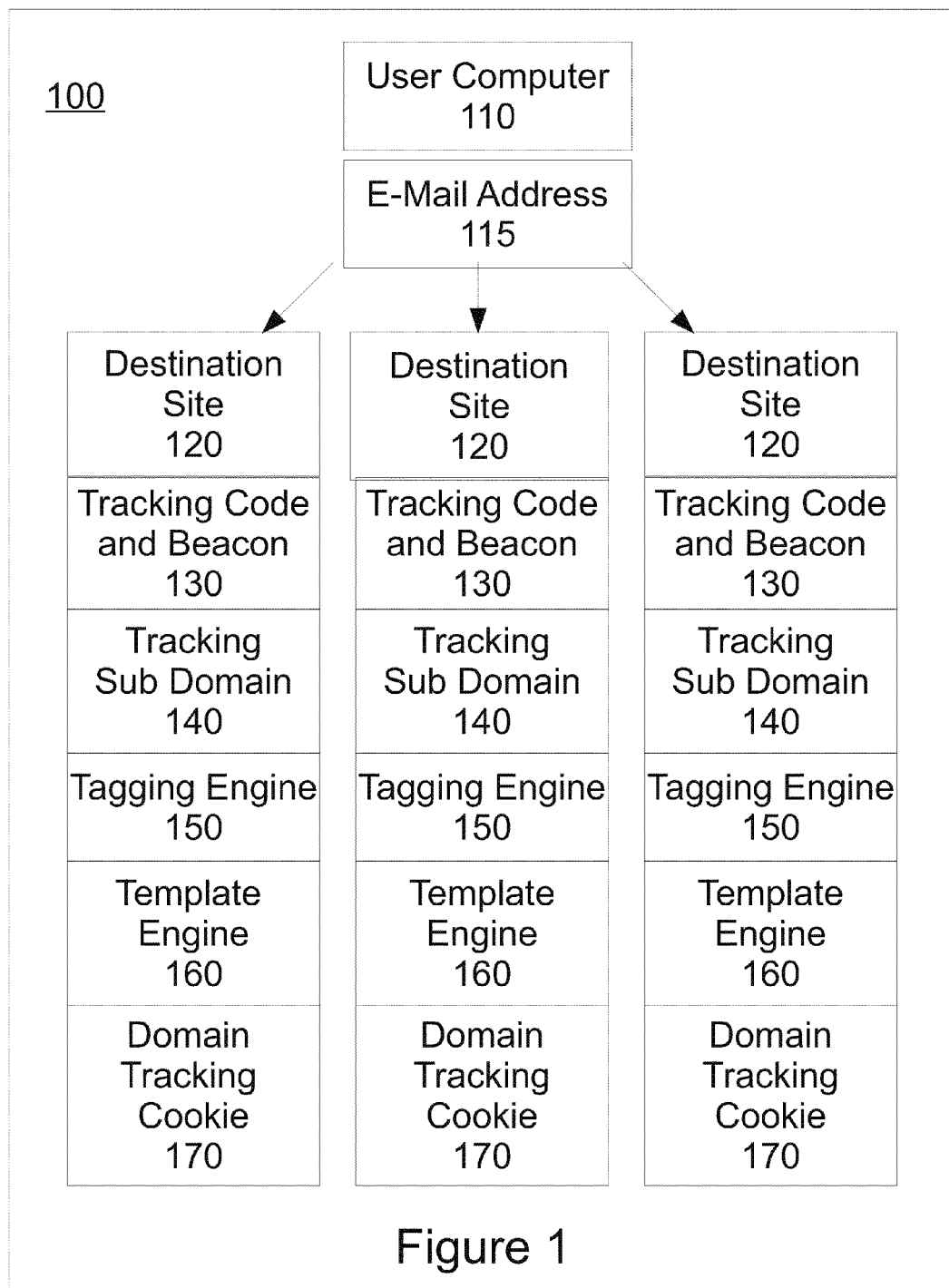
FIG. 1 illustrates an overview of the system architecture of a computerized system for linking a user's e-mail that tracks a user's interest and activity, in accordance with one embodiment of the present invention.

FIG. 1 illustrates an overview of the system architecture of a computerized system 100 for linking a user's computer 110 and e-mail address 115 that tracks a user's interest and activity, in accordance with one embodiment of the present invention. The computerized system 100 for linking a user's e-mail openings and click throughs on a user's e-mail address 115 to a user's online click stream that tracks a user's interests and activity behavior data on a user's destination websites 120 includes a programmable tracking code 130, a dedicated tracking sub domain 140, a customizable tagging engine 150, a template engine 160 and a custom user-unique domain tracking cookie 170.

The destination site 120 can be any suitable destination site that the user desires to utilize. The programmable tracking code 130 is embedded on the destination website 120 to track the user's interests and activity behavior data and update a user's profile. The dedicated tracking sub domain 140 can be any suitable dedicated tracking sub domain 140. The customizable tagging engine 150 can be any suitable tagging engine that is capable of being customized. The template engine 160 is utilized for customizing e-mail based on the user's behavior data and activity data. The custom user-unique domain tracking cookie 170 is generated and tied to an e-mail address 115 when the user clicks on a rewritten-link shared by the tracking sub domain 110.

The user is then tracked on site using a JavaScript embed on the destination site 120, although other suitable scripting programming languages can be utilized as well. The JavaScript beacon tracks the interests and onsite behavior of the user and updates the user's profile. This interest and behavior data can then be used to customize e-mail and the website to the user's' interests.

The computerized system 100 gathers unique per-user behavior and profiling data, customizes e-mail and site content on a per-user basis, compiles aggregate data about user profiles and gathers page views contributed related statistics from mass mailings. The user's interests and onsite behavior data can then be used to customize content and advertisements in e-mails and on websites to reflect the user's interests and activity. The computerized system 100 also utilizes shared unique-identifier tracking tied to an individual e-mail address across multiple triggered e-mail and mass-mail campaigns, a freeform user-interest tagging system and a formula to measure user interest as compared with broader populations.

Figure 2:
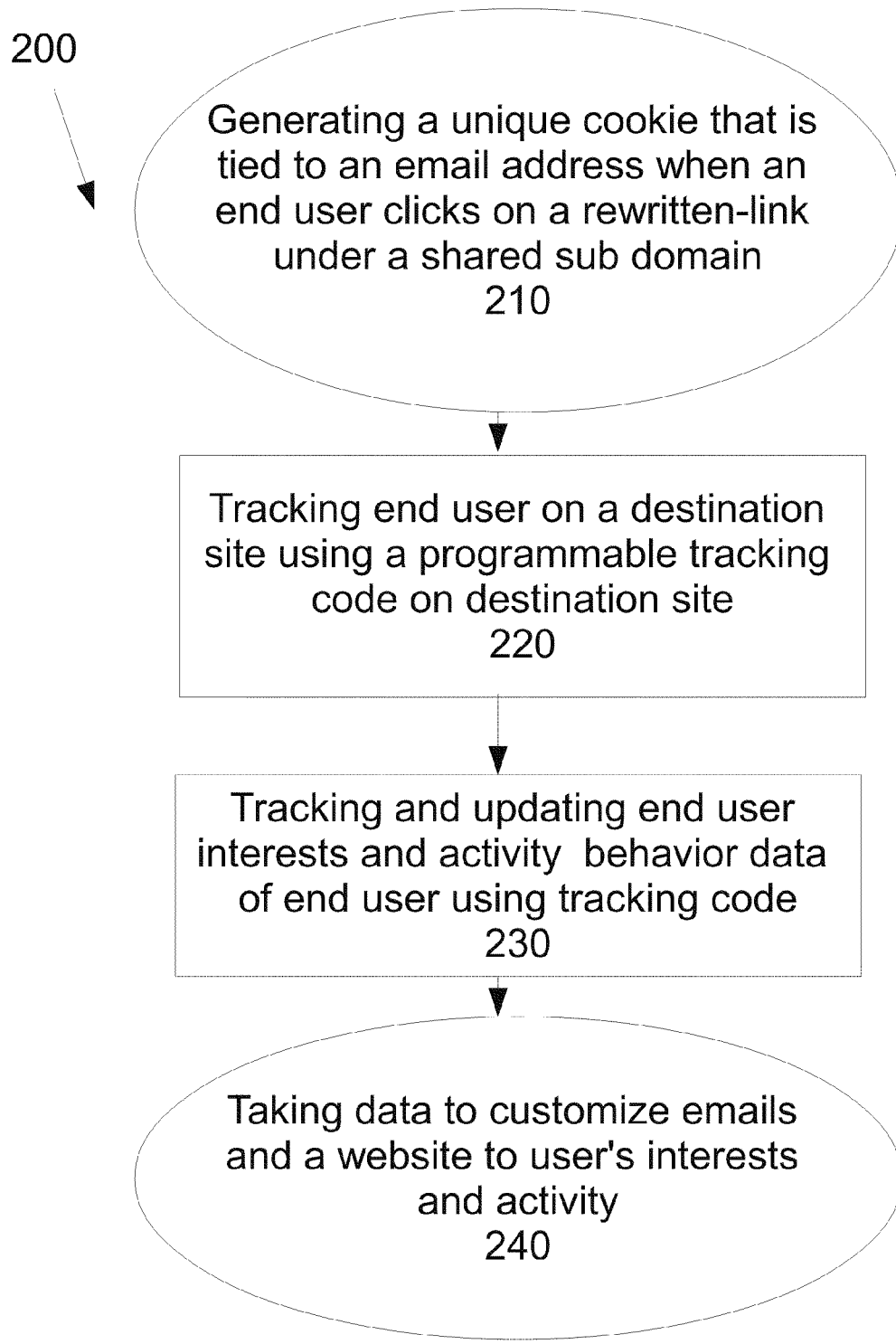
FIG. 2 illustrates a computerized method for linking a user's e-mail that tracks a user's interest and activity, in accordance with one embodiment of the present invention.

FIG. 2 illustrates a first flow chart of a computerized method 200 for linking a user's e-mail that tracks a user's interest and activity, in accordance with one embodiment of the present invention. The computerized system used in combination with the computerized method 200 has the same features and components as the computerized system described in FIG. 1 and its description.

The user's interests and activity behavior data can customize content and advertisements in the e-mails and on the websites to the user's interests and activity. The shared unique-identifier tracking is tied to the user e-mail address across multiple triggered e-mail and mass-mail campaigns, a freeform user-interest tagging system and a formula to measure the user interest as compared with broader populations.

While the present invention has been related in terms of the foregoing embodiments, those skilled in the art will recognize that the invention is not limited to the embodiments described. The present invention can be practiced with modification and alteration within the spirit and scope of the appended claims. Thus, the description is to be regarded as illustrative instead of restrictive on the present invention.

What is claimed is:

1. A computerized system including at least one processor to link a user's e-mail openings and click-throughs on said user's e-mail address and said user's computer to said user's online click stream that tracks said user's interests and activity behavior data on said user's destination websites, comprising:
   a dedicated tracking sub domain configured to compile aggregate data about at least mass-mail campaigns transmitted to computers of each of a plurality of users;
   a domain tracking cookie that is generated and tied to said user's email address when said user clicks on a rewritten-link shared by said tracking sub domain;
   a tracking code and beacon embeddable on said destination websites to track said user's interests and activity behavior data using said domain tracking cookie, and updating said user's profile to show said tracked interests and activity behavior data; and
   a template engine providing a plurality of templates utilized within said computerized system to customize content and advertisements in said e-mails and on said websites to said user's interests and activity as a function of said user's interests and activity behavior data and in comparison with a broader population of said plurality of users.

2. The system according to claim 1, wherein said domain tracking cookie is a user-unique domain tracking cookie.

3. The system according to claim 2, wherein a shared unique-identifier tracking is tied to said user e-mail address across multiple triggered e-mail and mass-mail campaigns, a freeform user-interest tagging system and a formula to measure said user interest as compared with broader populations.

4. The system according to claim 1, further comprising a customizable tagging engine.

5. The system according to claim 1, wherein said template engine customizes said e-mail based on said interests and behavior data.

6. A computerized system including at least one processor to link a user's e-mail openings and click-throughs on said user's e-mail address and said user's computer to said user's online click stream that tracks said user's interests and activity behavior data on said user's destination websites, comprising:
   a dedicated tracking sub domain configured to compile aggregate data about at least mass-mail campaigns transmitted to computers of each of a plurality of users;
   a domain tracking cookie that is generated and tied to said user's email address when said user clicks on a rewritten-link shared by said tracking sub domain;
   a tracking code and beacon embeddable on said destination websites to track said user's interests and activity behavior data using said domain tracking cookie, and updating said user's profile to show said tracked interests and activity behavior data; and
   a template engine providing a plurality of templates utilized within said system to customize content and advertisements in said e-mails and on said websites to said user's interests and activity as a function of said user's interests and activity behavior data and in comparison with a broader population of said plurality of users.

7. The system according to claim 6, wherein a shared unique-identifier tracking is tied to said user e-mail address across multiple triggered e-mail and mass-mail campaigns, a freeform user-interest tagging system and a formula to measure said user interest as compared with broader populations.

8. The system according to claim 6, wherein said template engine customizes said e-mail based on said interest behavior data.

9. A computer software method for linking a user's e-mail openings and click-throughs on said user's e-mail and said user's computer to said user's online click stream and which tracks said user's interests and activity behavior data on said user's destination websites visited by said user utilized with a computerized system, comprising:
   generating a unique domain tracking cookie that is tied to an e-mail address when said user clicks on a rewritten-link under a dedicated tracking shared sub domain configured to compile aggregate data about at least mass-mail campaigns to a plurality of users;
   tracking said user on a destination site using a tracking code and beacon embedded on said destination site;
   tracking and updating said user interests and activity behavior data of said user using said tracking code and beacon;
   updating said user's profile to show said tracked interests and activity behavior data; and
   customizing content and advertisements in e-mails and said website to said user's interests and activity as a function of said user's interests and activity behavior data and in comparison with a broader population of said plurality of users.

10. The method according to claim 9, wherein said unique identifier tracking cookie is tied to said user e-mail address across multiple triggered e-mail and mass-mail campaigns, a freeform user-interest tagging system and a formula to measure said user interest as compared with broader populations.

11. The method according to claim 9, wherein said computerized system includes a template engine that customizes said e-mail based on said interests and activity behavior data.

12. The method according to claim 9, wherein said computerized system includes a customizable tagging engine.

13. The method according to claim 9, wherein said computerized system includes a template engine to create a plurality of templates utilized within said system.

* * * * *